United States Patent [19]

Counseller et al.

[11] Patent Number: 5,058,528
[45] Date of Patent: Oct. 22, 1991

[54] CAT LITTER BOX APPARATUS AND METHOD

[76] Inventors: Erika R. Counseller, 6261 E. 20th St., Tucson, Ariz. 85711; Susan M. Rinard, 4675 S. Harrison, #246, Tucson, Ariz. 85730

[21] Appl. No.: 450,239

[22] Filed: Dec. 13, 1989

[51] Int. Cl.$^5$ .............................................. A01K 29/00
[52] U.S. Cl. ......................................... 119/165; 4/476
[58] Field of Search ............... 119/1; 4/474, 464, 467, 4/476, 479

[56] References Cited

U.S. PATENT DOCUMENTS

| 90,709 | 6/1869 | Waring | 4/464 |
|---|---|---|---|
| 91,474 | 10/1870 | Moule et al. | 4/464 |
| 107,358 | 9/1870 | Girdlestone et al. | 4/464 |
| 109,276 | 11/1870 | Vanderveer | 4/464 |
| 118,681 | 9/1871 | Bliss | 4/464 |
| 122,784 | 1/1872 | Sherman | 4/464 |
| 127,606 | 6/1872 | Jaqua | 4/467 |
| 186,446 | 1/1877 | Altemus | 4/467 |
| 187,991 | 3/1877 | Thompson | 4/467 |
| 3,921,582 | 11/1975 | Sedmeir | 119/1 |
| 4,117,555 | 10/1978 | Dennis | 119/1 X |

FOREIGN PATENT DOCUMENTS

| 1198638 | 12/1985 | Canada | 119/1 |
|---|---|---|---|
| 2561066 | 9/1985 | France | 119/1 |

OTHER PUBLICATIONS

Product Label for Cat Pan Liners by Van Ness Plastic Molding Co., Inc., 55t Cortlandt St., Belleville, N.J. 07109.
Amway Homeshopper Catalog 1989, Item G Booda-Box Odor-Free Litter Box.
Sales Catalog for Cat Claws Inc., P.O. Box 1774, Des Plaines, IL 60018, Item #190, Hooded Litter Pan, (Last Page of Catalog).

Primary Examiner—Gene Mancene
Assistant Examiner—R. Thomas Price
Attorney, Agent, or Firm—Victor Flores

[57] ABSTRACT

The present invention discloses a cat litter box apparatus and method. The apparatus includes component parts that combine to resemble a human toilet facility. The component parts include a tank member for storing and dispensing cat litter material, a bowl-like base member detachably connected to the tank member, a drawer member that is removably enclosed within the bowl-like base member for receiving fresh cat litter material from the tank member and for being used by a cat for going to the toilet.

4 Claims, 2 Drawing Sheets

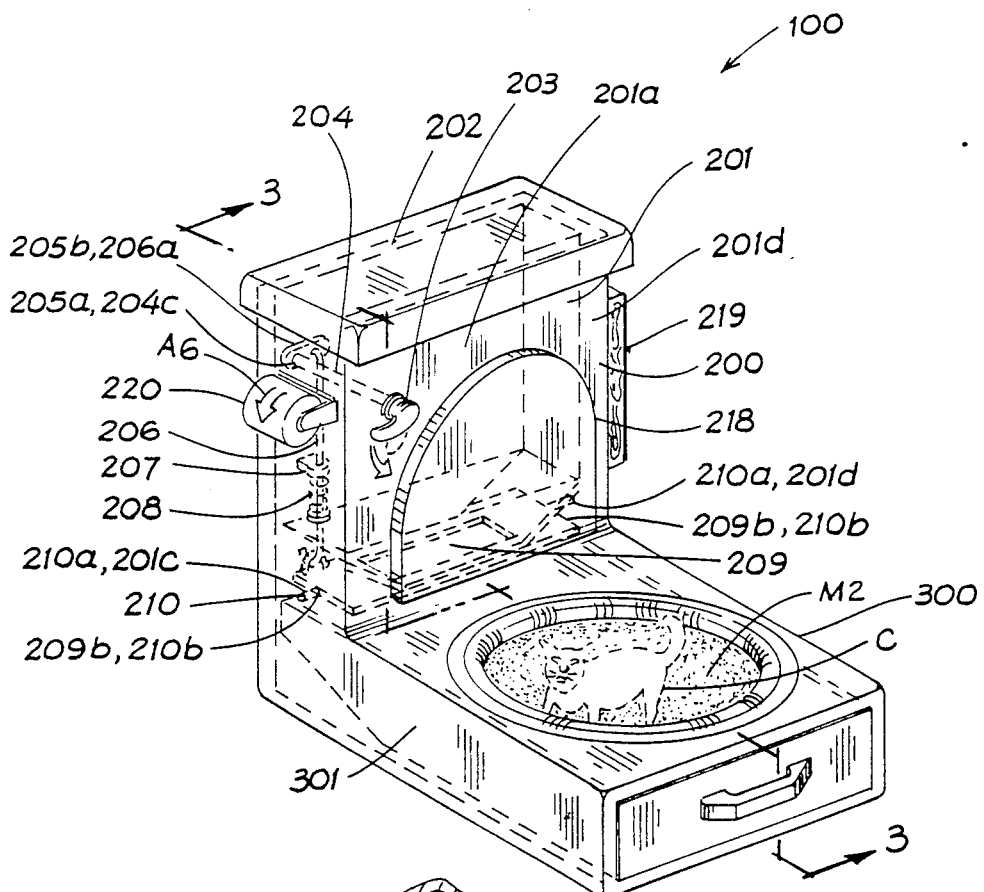
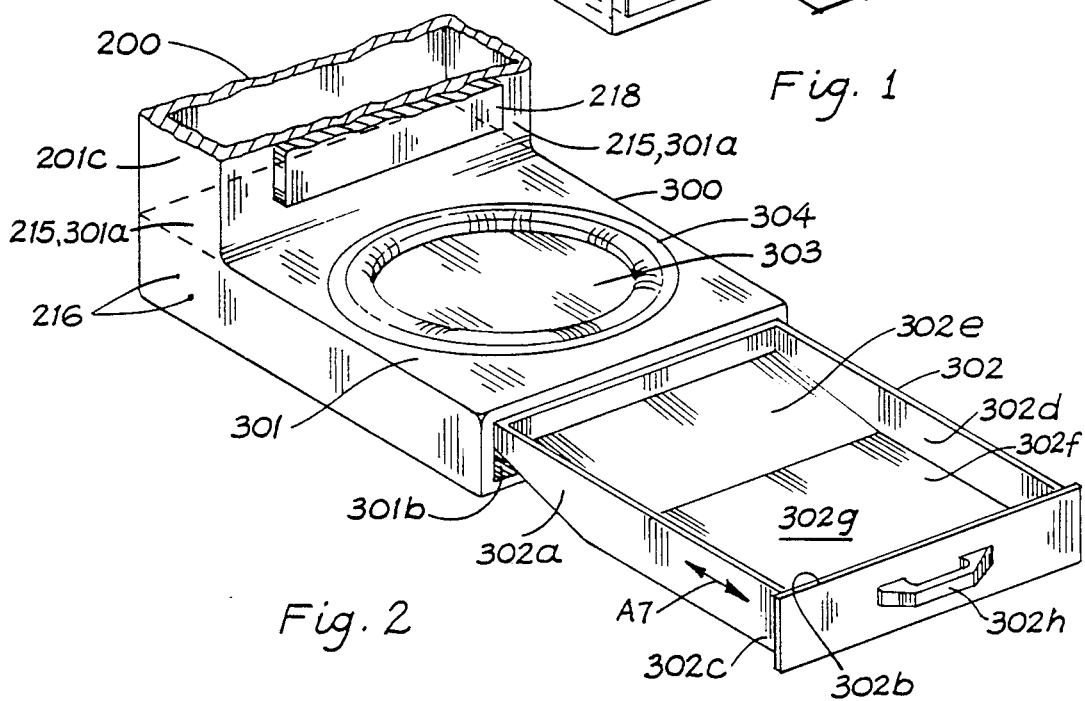

5,058,528

CAT LITTER BOX APPARATUS AND METHOD

FIELD OF THE INVENTION

This invention relates to animal toilet apparatus and method. More particularly, the present invention relates to pet animal toilet apparatus and method that includes design attributes that appeal to the pet owner. Even more particularly, the present invention relates to cat toilets, or cat litter box apparatus and method that use commercially available cat litter material and includes component parts that combine to resemble a human toilet facility.

DESCRIPTION OF THE PRIOR ART

It is known that certain domesticated animals, such as pet cats, are kept indoors by their owners. It is also known that cats are receptive to being trained to use an indoor provided cat litter facility, commonly referred to as a cat litter box. It is also known to provide the cat litter boxes in a suitable, generally rectangular form, such that they can contain cat litter material that simulates a natural outdoor environment that is conducive to animal instincts to perform their toilet needs. Traditionally, the cat litter boxes are provided in such rectangular forms, or with slight modifications that allow clamp-on of a plastic liner to contain the cat litter. The FRAMED CAT PAN manufactured by Van Ness Molding Co., Inc., Belleville, N.J. is typical of such designs. The next level of sophistication in the known art of cat litter boxes are cat litter boxes of the type that are provided with a cover, or hood that forms an entry way for the cat and contains odors, or in a modified manner, are provided with an exhaust filter system in the hood portion. Typical of this design are a HOODED LITTER PAN, listed as item #190 in a 1989 catalog published by Cat Claws, Inc., Des Plains, Ill. and an odor-free cat litter box, termed BOODA BOX, listed in a 1989 Amway Home Shopper catalog.

Although the known prior art apparatus function to meet the animal's toilet needs, there are unsolved problems associated with their use. For example, the aesthetic qualities lack features that can be coordinated with a cat pet owner's furnishings/fixtures in a room such as in a bathroom, which is considered an appropriate place to locate a cat litter box. Also, since the prior art cat litter boxes lack a storage tank, the refill cat litter material must be located remotely from the point of use, and as such, results in fewer replacement of the used cat litter material and associated foul odors.

Therefore, a need is seen to exist for a cat litter box apparatus that continues to function as the prior art for purposes of providing an indoor toilet means for domesticated indoor-kept animals, such as a cats, but that further includes component parts that combine to provide a convenient storage/dispensing tank member and the primary cat litter container member. A need is also seen to exist for a cat litter box apparatus that is shaped in a decor that can be coordinated with the pet owner's indoor furnishings/fixtures in a room such as a bathroom, which by example only, can resemble the shape and style of a human toilet facility.

Accordingly, the primary object of the present invention is to solve the above noted deficiencies by providing a cat litter box apparatus that continues to function as the prior art for purposes of providing an indoor toilet means for domesticated indoor-kept animals, such as cats, but that further includes component parts that combine to provide a convenient storage/dispensing tank member attached to the primary cat litter container member.

It is another object of the present invention to provide a cat litter box apparatus that is shaped in a decor that can be coordinated with the pet owner's indoor furnishings/fixtures in a room such as a bathroom, which by example only, can resemble the shape and style of a human toilet facility.

It is yet another object of the present invention to provide a method of dispensing cat litter material into a cat litter box apparatus.

SUMMARY OF THE INVENTION

The present invention satisfies the foregoing objectives by providing a cat litter box apparatus that includes component parts that combine to resemble a human toilet facility. The component parts include a tank member for storing and dispensing cat litter material, a bowl-like base member, a drawer member that is removably enclosed within the bowl-like base member for receiving fresh cat litter material from the tank member and for being used by a cat for going to the toilet.

Therefore, to the accomplishments of the foregoing objects, the present invention consists of the foregoing features hereinafter fully described and particularly pointed out in the claims, the accompanying drawings and the following disclosure describing in detail the invention, such drawings and disclosure illustrating, however, but one of the various ways in which the invention may be practiced.

BRIEF DESCRIPTION OF THE DRAWINGS

FIG. 1 is a perspective view of the present invention illustrated in a preferred form resembling the structural form of a human toilet facility, comprising a tank member and a bowl-like base cat litter container member.

FIG. 2 illustrates, a segmented view of the tank member and the removable cat litter, drawer-like, box member.

DESCRIPTION OF THE PREFERRED EMBODIMENT

Figure 3:
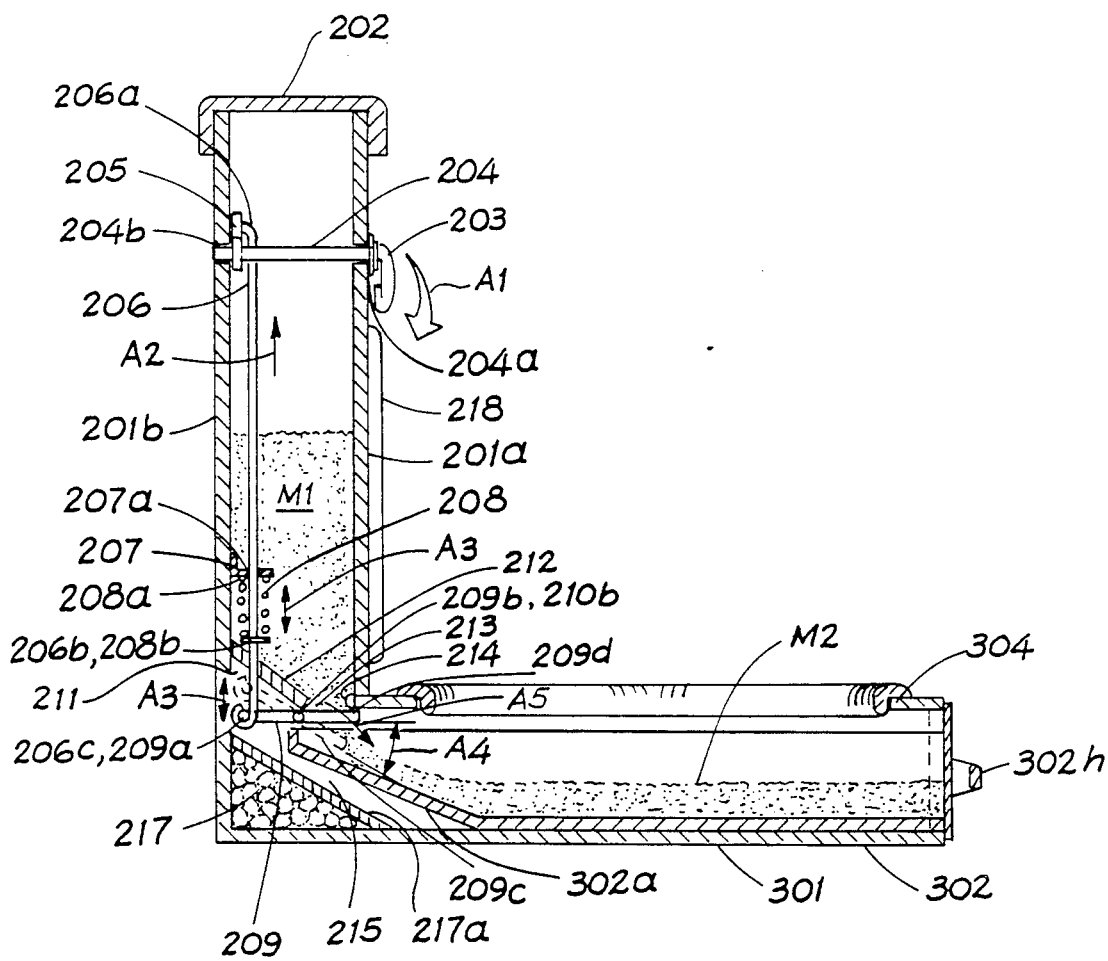
FIG. 3 is a cross-sectional view taken along the line 3—3 of FIG. 1 illustrating functional members of the apparatus that enable dispensing of the cat litter material from the tank member into the removable cat litter box member.

FIGS. 1, 2 and 3 show, cat litter box apparatus 100 comprising a tank member 200 and a base cat litter container member 300. Tank member 200 is comprised of a storage container 201, a cover 202 and a dispensing mechanism (comprised of actuating lever 203, interconnecting horizontal shaft 204, interface plate 205, vertical shaft 206, guide plate 207, return spring 208, dispensing swivel plate 209 and pivot shaft 210), a pivot chamber 211, a slide plate 212, a dispensing trap opening 213, elongated seal member 214, attachment interface chamber 215, attachment means 216, weighted support 217 and fake lid 218. Base cat litter container member 300 is comprised of an outer bowl-like structure 301, a removable cat litter drawer 302, a cat entry opening 303, and a fake toilet seat 304. Storage container member 201 is comprised of a frontside 201a, a backside 201b, a leftside 201c and a right side 201d. In the preferred embodiment, storage container 201 is designed to be positioned upright with the aid of weighted support 217 and horizontally attached outer bowl-like structure 301 at sides 201c and 201d. Outer bowl-like structure 301 is provided with a terminating end 301a (that fits within attachment interface chamber 215 and angled upper boundary 217a for weighted support 217) and an opening 301b for receiving cat litter drawer 302. Cat litter drawer 302 is designed to fit within a chamber formed within structure 301 and is provided with a terminating side end 302a and angled backside member 302e of bottom 302g formed to conform to angled upper boundary 217a and for receiving fresh cat litter material M1 via dispensing trap opening 213 and dispensing swivel plate 209. The dispensed and usable cat litter material M2 is easily distributed throughout bottom 302g by a using cat C. Cat litter drawer 302 is also provided with a frontside 302b having a handle 302h thereto and being attached to side portions 302c and 302d and bottom portion 302f.

In operation, the dispensing mechanism is actuated by lever 203 in the direction A1. Shaft 204 is fixedly coupled to lever 203 at first end portion 204a and to interface plate 205 at joint formed by shaft portion 204c and interface plate end portion 205 a. Shaft 204 is pivotly connected to backside 201b at shaft end portion 204b. Interface plate 205 is fixedly connected to vertical shaft 206 at joint formed by interface plate end 205b and upper vertical shaft end 206a. Upon actuating lever 203 in the direction A1, vertical shaft 206 is urged upwardly in the direction of arrow A2, which shaft 206 is guided by guide plate 207 via guide hole 207a. Spring 208 is retained between plate 207 at spring upper end 208a and at spring lower end 208b by retainer portion 206b in order to produce a return compression as indicated by compression arrow A3 upon shaft 206 being urged upward. The same compression and upward motion of arrow A3 is translated to the lower end of shaft 206 at a joint formed by lower vertical shaft end 206c and a first end 209a of dispensing swivel plate 209. The compression action denoted by arrow A3 causes dispensing swivel plate 209 to swivel at swivel points formed by pivot ends 210a of pivot shaft 210 attached to sides 201c and 201d, as indicated by arrow A4 and thereby opening to allow cat litter material M1 to flow as shown by arrow A5, swivel plate midportion 209b being fixedly attached to pivot shaft 210 at pivot shaft portions 210b and swivel plate portion 209c extending onto drawer backside 302e during dispensing of fresh cat litter material M1. Second end 209d of swivel plate 209 contacts seal member 214 upon release of lever 203 due to the return compression force of spring 208 to close off the flow of material M1. Drawer 302, containing dispensed cat litter material M2 is used by cat C, and as required, can be removed from structure 301 as indicated by arrow A7 to dispose of the used cat litter material M2. It should be understood that drawer 302 may be provided with a liner (not shown) to contain material M2 for easy and sanitary disposal.

As an added feature, the present invention is provided with a fabric means 219 for clawing by a cat C. Fabric means 219 may be formed elongated and attached to a side, such as side 201d. Additionally, a toy, such as a fake roll of toilet paper 220, is provide for amusement and entertainment purposes.

Therefore, while the present invention has been shown and described herein in what is believed to be the most practical and preferred embodiment, it is recognized that departures can be made therefrom within the scope of the invention, which is therefore not to be limited to the details disclosed therein but is to be accorded the full scope of the claims so as to embrace any and all equivalent apparatus.

We claim:

1. A pet animal litter box apparatus, said apparatus comprising:
   (a) tank means for storing litter material;
   (b) base means for interfacing with said tank means; and
   (c) drawer means removably enclosed within said base means for receiving said litter material from said tank means and for being used by a pet animal, such as a cat, for going to the toilet,
   said base means having an entry way for allowing said animal to access said litter material,
   said tank means including dispensing means disposed within said tank means for controllably dispensing said cat litter material into said drawer means, said dispensing means including: lever means externally protruding from said tank means for initiating dispensing of said cat litter material, first shaft means coupled to said lever means for transferring actuating action from said lever means, second shaft means coupled to said first shaft means for translating said actuating action, a swivel dispensing plate means interconnected to said second shaft means for responding to said actuating action to dispense said litter material into said drawer means and spring means for maintaining said swivel dispensing plate in a closed position by providing an opposing force to said actuating action,
   said tank means being shaped in a substantially rectangular form and having a top cover and a side appendage cover member, said form being substantially similar to a tank member of a human toilet facility having a rectangular shape, said side appendage cover member being fixedly attached to said tank member for simulating a raised lid for said human toilet facility, and
   said base means having a fixedly attached, ring-like seat appendage member encircling said entry way.

2. A pet animal litter box apparatus, as recited in claim 1, wherein: said tank member having a fabric means attached to a side for clawing by said cat.

3. A pet animal liter box apparatus, as recited in claim 1, wherein:
   said tank member having a toy means attached to a side for amusing said cat, said toy means comprises a fake roll of toilet paper.

4. A method of dispensing litter material into a pet animal litter box apparatus, said method comprising the steps of:
   (a) providing a pet animal litter box apparatus, said apparatus comprising:
       (i) tank means for storing litter material;
       (ii) base means for interfacing with said tank means; and
       (iii) drawer means removably enclosed within said base means for receiving said litter material from said tank means and for being used by a pet animal, such as a cat, for going to the toilet,
       said base means having an entry way for allowing said animal to access said litter material,
       said tank means including dispensing means disposed within said tank means for controllably dispensing said cat litter material into said drawer means, said dispensing means including: lever means externally protruding from said tank means for initiating dispensing of said cat litter material, first shaft means coupled to said lever means for transferring actuating action from said lever means, second shaft means coupled to said first shaft means for translating said actuating action, a swivel dispensing plate means interconnected to said second shaft means for responding to said actuating action to dispense said litter material from said tank means into said drawer means and spring means for maintaining said swivel dispensing plate in a closed position by providing an opposing force to said actuating action, said tank means being shaped in a substantially rectangular form and having a top cover and a side appendage cover member said form being substantially similar to a tank member of a human toilet facility having a rectangular shape, said side appendage cover member being fixedly attached to said tank member for simulating a raised lid associated with said human toilet facility, and said base means having a fixedly attached, ring-like seat appendage member encircling said entry way;

(b) filling said tank means with fresh litter material; and (c) dispensing said fresh litter material into said drawer means by actuating said lever member and urging said swivel dispensing plate means to an open position.

* * * * *